(12) United States Patent
Krammer

(10) Patent No.: US 11,833,773 B2
(45) Date of Patent: Dec. 5, 2023

(54) ARRANGEMENT FOR PRESSING LIQUID-CONTAINING RAW MATERIALS, HAVING A FLEXIBLE PRESS CONTAINER

(71) Applicant: Willmes Anlagentechnik GmbH, Lorsch (DE)

(72) Inventor: Volker Krammer, Weinheim (DE)

(73) Assignee: Willmes Anlagentechnik GmbH, Lorsch (DE)

( * ) Notice: Subject to any disclaimer, the term of this patent is extended or adjusted under 35 U.S.C. 154(b) by 0 days.

(21) Appl. No.: 18/029,453

(22) PCT Filed: Aug. 31, 2021

(86) PCT No.: PCT/EP2021/074021
§ 371 (c)(1),
(2) Date: Mar. 30, 2023

(87) PCT Pub. No.: WO2022/069140
PCT Pub. Date: Apr. 7, 2022

(65) Prior Publication Data
US 2023/0286238 A1    Sep. 14, 2023

(30) Foreign Application Priority Data

Sep. 30, 2020  (DE) ...................... 10 2020 125 603.5
Sep. 30, 2020  (DE) ...................... 10 2020 125 608.6

(51) Int. Cl.
*B30B 9/22*     (2006.01)
*B30B 15/04*    (2006.01)
*C12G 1/02*     (2006.01)

(52) U.S. Cl.
CPC ............... *B30B 9/225* (2013.01); *B30B 9/22* (2013.01); *B30B 15/04* (2013.01); *C12G 1/0209* (2013.01)

(58) Field of Classification Search
CPC .. B30B 1/003; B30B 5/02; B30B 9/22; B30B 9/225; B30B 15/04; C12G 1/0216; C12G 1/0206; C12G 1/0209; A47J 19/06
See application file for complete search history.

(56) References Cited

U.S. PATENT DOCUMENTS

| | | | | |
|---|---|---|---|---|
| 3,276,594 A | * | 10/1966 | Gwilliam | ............... B01D 29/70 210/411 |
| 6,994,021 B2 | * | 2/2006 | Krammer | .................. B30B 9/22 100/114 |
| 2015/0147433 A1 | * | 5/2015 | Singh | ....................... C12H 1/22 426/15 |

FOREIGN PATENT DOCUMENTS

| | | |
|---|---|---|
| CH | 412577 A | 4/1966 |
| DE | 69005771 T2 | 7/1994 |

(Continued)

*Primary Examiner* — Jimmy T Nguyen
(74) *Attorney, Agent, or Firm* — Laurence A. Greenberg; Werner H. Stemer; Ralph E. Locher

(57) ABSTRACT

An arrangement for pressing liquid-containing raw materials includes a press container which is rotatable about an axis of rotation and the interior of which is subdivided by a pressing membrane into a pressure-medium space and a pressing medium chamber. A filling and emptying opening, which can be closed in a pressure-tight manner and via which liquid-containing material to be pressed can be introduced into the pressing medium chamber, is arranged in the press container. At least one drainage element is located in the pressing medium chamber. The interior of the drainage element communicates with a juice outlet of the press container, via which liquid juice can be supplied to a juice collecting vessel during a pressing process. The press container is formed of a pressure-resistant flexible plastics material and is received in an inherently rigid support framework that is rotatable about the axis of rotation.

20 Claims, 13 Drawing Sheets

(56) References Cited

FOREIGN PATENT DOCUMENTS

| DE | 102009054327 A1 * | 6/2011 | ............... B30B 9/22 |
|----|---|---|---|
| EP | 0585596 A1 | 3/1994 | |
| EP | 0611173 A1 | 8/1994 | |
| FR | 2530424 A1 | 1/1984 | |
| WO | 03035381 A1 | 5/2003 | |

* cited by examiner

ARRANGEMENT FOR PRESSING LIQUID-CONTAINING RAW MATERIALS, HAVING A FLEXIBLE PRESS CONTAINER

FIELD AND BACKGROUND OF THE INVENTION

The invention relates to an arrangement for pressing liquid-containing raw materials, in particular grapes, having a flexible press container which is rotatable about an axis of rotation and the interior of which is divided by a press membrane into a pressure medium chamber and a pressing medium chamber. A filling and emptying opening which is closable in a pressure-tight manner is arranged in the press container, via which opening liquid-containing pressing material can be introduced into the pressing medium chamber. At least one drainage element is arranged in the pressing medium chamber. The interior of the drainage element communicates with a juice outlet of the press container, via which liquid juice can be supplied to a juice collecting container during a pressing operation.

Presses for pressing liquid-containing raw materials are known, for example, from WO 03/035381 A1 and are used to squeeze out the grape juice used as the starting material for wine production from grapes which have been introduced into the press. The press disclosed in WO 03/035381 A1 has a closed container which can be set into rotation about its horizontal longitudinal axis and the interior of which is divided by a press membrane into a pressure medium chamber and a pressing medium chamber, and in the container casing of which a filling and emptying opening which is closable by a lid is arranged, opposite which opening there is a juice outlet located in the pressing chamber. In the pressing medium chamber, liquid-permeable drainage elements are also arranged across the diameter and substantially perpendicular to the container axis, said drainage elements extending diametrically from one end of the container to the other end. The drainage elements have a flexible support element around which a juice-permeable fabric hose is arranged. In the juice extraction position, the drainage elements extend in a substantially vertical direction in order to feed the juice to a juice collecting nozzle which is located therebelow and from where the juice is conveyed via a collecting line to a collecting container.

The press described in WO 03/035381 A1 is designed in the same way as all other pneumatic fruit and grape presses currently on the market as a fixedly assembled module and essentially consists of a machine stand/frame on which the respective functional subassemblies are permanently mounted.

In addition to the locally fixed installation of a plurality of presses, the latter can also be installed movably on rollers, resulting in a large number of spatial configurations, of which a linearly fixed installation has established itself as the most economical type of installation with regard to loading and transporting away of the pomace.

One problem of the known presses is that the press container is designed as a pressure container in accordance with the Pressure Equipment Directive, which makes its production expensive. For example, most of the previously known pneumatic presses use atmospheric positive pressure (1.2 to 2 bar, in special cases up to 3 bar) to generate the pressure gradient which is required for the pressing, with which pressure the pressure medium chamber is charged via rotary feedthroughs. Thus, all pressurized parts of the press container fall under Pressure Equipment Directive 2014/68/ EU; and the press as an assembly is considered to be "pressure equipment" within the meaning of this guideline, which, in addition to the increased costs for the production of press containers, also disadvantageously leads to one-off and recurring testing costs for the notified bodies, which are included in the overall economic calculation in addition to the safety measures on the installation side.

Another cost-intensive aspect when using high pressures is the production of the pressure medium in an appropriate quantity.

A further problem with the known presses described above is that they generally have a horizontal press container. This is due to the fact that the press containers of all currently known pneumatic presses are designed substantially as horizontal cylinders because of the necessary rotation, the greatest possible use of space and the simplest possible production, with a rolled casing sheet being used between two floors. This means that the press membrane is inevitably designed as a half-shell, with one or more membranes being installed depending on the press system. However, the following problems arise in the presses with cylindrical press containers due to the design:

Cone formation of the pressing material during the filling via the lid of the press container. Due to the elongate extent of the cylindrical press container and the limited number and size of the filling and emptying openings and lid, material cones are formed when the press is filled with non-liquid pressing material, which prevent the complete filling of the product chamber in the press container and can be avoided only by rotation of the press container.

Problems when emptying the pressing residues. As with the filling, also when emptying the pressing residues, virtually complete emptying can be achieved only by continuously rotating the press container within a reasonable amount of time (usually 10-40 minutes). To improve the emptying, additional spiral-shaped discharge elements, which work on the principle of discharge plates of a concrete mixer, are sometimes used, which, in addition to the disruptive effect on the press membrane (if mounted on the pressure medium side), require continuous and unidirectional rotation of the press container.

Problems with the complete emptying of cleaning media. Due to the inevitably horizontal fixing of the press membrane in the casing region of the press container, bulges and shoulders often arise, which are difficult to clean and prevent the complete drainage of cleaning water or cleaning media. In the event of insufficient rinsing, the cleaning agents remaining in the elongate puddles that are formed in this way can cause great damage to the press membrane.

Further disadvantages often also arise with the above-described presses with elongate cylindrical press containers when manufacturing the press membrane, the previously described necessary half-shell shape of which entails the problem that, in the transition region from the cylindrical part to the semi-circular bottom region, the membrane material builds up in the region of the approx. 3-10 cm wide connecting weld seam. This already leads to irregularities in the surface quality and durability of the sensitive press membrane during the manufacture of the press. In addition, the press membrane is pushed back and forth during the press operation, which leads to increased buckling loads on the membrane material in the region of the above-mentioned bottom weld seam and is the most common cause of total loss of the press membrane.

In addition to the shortcomings described above, the known presses also have physical disadvantages in terms of pressing. When investigating the operations involved in pressing grapes from the aspect of gentle processing, it was recognized that the states of stress within the substantially spherical grapes depend on the selected geometry of the pressed body. In order to avoid unnecessarily high shearing forces within the grapes, it is desirable to apply pressure as evenly as possible from all sides in order to press the pressing material as gently as possible and to avoid the escape of bitter substances due to local pressure peaks.

A further difficulty, which has a lasting negative effect on the quality of the grape juice produced or of the pressing material in general, is that the juice produced during the pressing operation is collected in a stationary trough which is located below the rotatable press container. Depending on the design of the press, the juice is first brought together in or on the press container from a plurality of juice outlets and fed into the stationary trough at the lowest point by gravity during rotation or when the container is stationary. It is imperative that the juice overcomes the distance between the press container and the juice collecting container (juice trough) in free fall, since the required rotation of the press container does not allow a closed pipe connection.

A disadvantage of this gravitational emptying of the juice into the juice trough is the lack of process control (splashing, sloshing), and the uncontrolled effect of the ambient air (oxidation, temperature, etc.), or the possible pollution by dust and insects in particular, which are greatly attracted by the high sugar content of the grape juice produced and often die in the juice trough.

To counteract this, it is known to use coupling mechanisms which, in the case of a central collection of the juice on or in the press container, conduct the juice to the collecting trough in a corresponding position of the press container at the lowest point by mechanical coupling, e.g. by an inert gas coupling, with the greatest possible exclusion of ambient air. However, this possibility is very costly, cleaning-intensive and disruptive.

Another shortcoming which results from the previously described gravitational discharge of the pressed grape juice from the press container is that the overall height of the press increases significantly. Due to the construction methods described above, the gravitational discharge and central collecting of the product within a collecting trough increases the overall height of the press by approx. 300 to 1000 mm, which requires an increased building height for installing it and can therefore often lead to problems in existing buildings.

In addition to the increased overall height, the presses described above require more space because of the design. This is due to the fact that the press container, which takes up the largest part of the installation space at approx. 75-85%, is continuously connected to the frame and to the structural components accommodated thereon. In the case of a plurality of presses, the construction space required for the supply units, which are necessary for each individual press, is added to this.

Furthermore, there is the problem that, in addition to the very low use of the presses over the year, the use of the installed units is relatively low even during pressing, due to the non-continuous pressing operation. This means that the drive motor for the container rotation only operates for about 2 minutes about every 3-5 minutes. With appropriate pressing programs, the interval sometimes even increases to every 15-30 minutes, which corresponds to a utilization of only approx. 10-40%. Furthermore, the unit for turning the membrane is usually likewise only put into operation for about 2 minutes about every 3-5 minutes, which corresponds to a utilization of about 30-40%. In addition, the control (PLC) and the HMI for the automation and visualization of the process are likewise only partially utilized (approx. 30%).

As the applicant has also recognized, another shortcoming arises from the fact that the press is used as a machine within the production process and is operated in a discontinuous processing process. In this context, a common feature of all pneumatic presses with pressure containers is that the system-related processing process includes the following working steps:

1. Filling (duration: between 2 min and 2 hours)
2. Pressing operation (duration: between 60 min and 4 hours)
3. Emptying of the pressing residues (duration: between 10 and 30 minutes)
4. Cleaning of the press container (duration: between 15 and 30 minutes in case of quick cleaning)

After the press has been filled, the press then cannot be filled again for approx. 2-6 hours. If pressing material is supplied continuously, it is therefore not possible to work continuously with one individual press. In practice, a number of presses adapted to the filling capacity and a correspondingly variable filling transport system has to be provided for continuous processing.

The applicant has found that, for example, 7 presses are required to achieve continuous filling in order to ensure that the first press can be refilled after about 4 hours.

Another disadvantage of the previously known presses with steel pressure containers is the temporary monofunctional use of the presses. Within the entire production process of processing pressing material, the presses are only used for pressing, i.e. separating the liquid components from the solid components of the pressing material (in the food sector: grapes, herbs, fruits, etc.), which takes place 1 to 4 times a day for processing grapes during the harvesting period (approx. 4 to 6 weeks per year). Occasionally, the press is also used for the maceration operation (temporary storage/exposure of the grape mash before pressing, for approx. 3-20 hours). For the rest of the time during the harvest or the year, the presses, including the container volume, are unused. Other possible uses within the production process are limited or not possible at all due to the closed design as a complete module.

Finally, another problem is that the processing capacity of the presses, due to their design, is primarily determined by the size of the press container, which usually precludes the possibility of adjusting the processing capacity of an existing press. However, when dimensioning a processing plant, the selection of the press size and the number of presses used constitute a decisive part of the economic consideration, and therefore where possible the processing capacity of a press should be matched as well as possible to the amount of pressing material to be processed. The interaction of processing type, delivery quantity, duration and type of pressing cycles, pomace removal, cleaning and space requirements has to be precisely tailored to the desired current and future needs of an enterprise. For example, the use of presses of excessive size which can only be partially filled leads to increased acquisition costs as well as increased time and energy requirements. At the same time, the consistency of the processing of the pressing material cannot be ensured if the press is not sufficiently filled. The capacity utilization of the existing presses also changes due to, for example, weather-related fluctuations in the quantities of pressing material, and therefore small quantities are advantageously processed only with smaller presses, which requires the use of different sizes of presses.

In addition, expansion of the press capacities is usually only possible through the use of additional presses, which sometimes leads to considerable structural changes and associated costs.

The disadvantage of needing a plurality of sizes of presses for different processing quantities/sorting leads either to a lower utilization or to processing bottlenecks, since the process of harvesting the pressing material cannot be controlled precisely enough for natural reasons.

BRIEF SUMMARY OF THE INVENTION

Accordingly, it is an object of the present invention to create an arrangement for pressing liquid-containing products, in particular grapes or fruit, which arrangement avoids the above-described shortcomings of the prior art.

According to the invention, this object is achieved by an arrangement having the features as claimed.

The invention will be explained below with reference to the drawings. In the drawings:

DETAILED DESCRIPTION OF THE INVENTION

Figure 2:
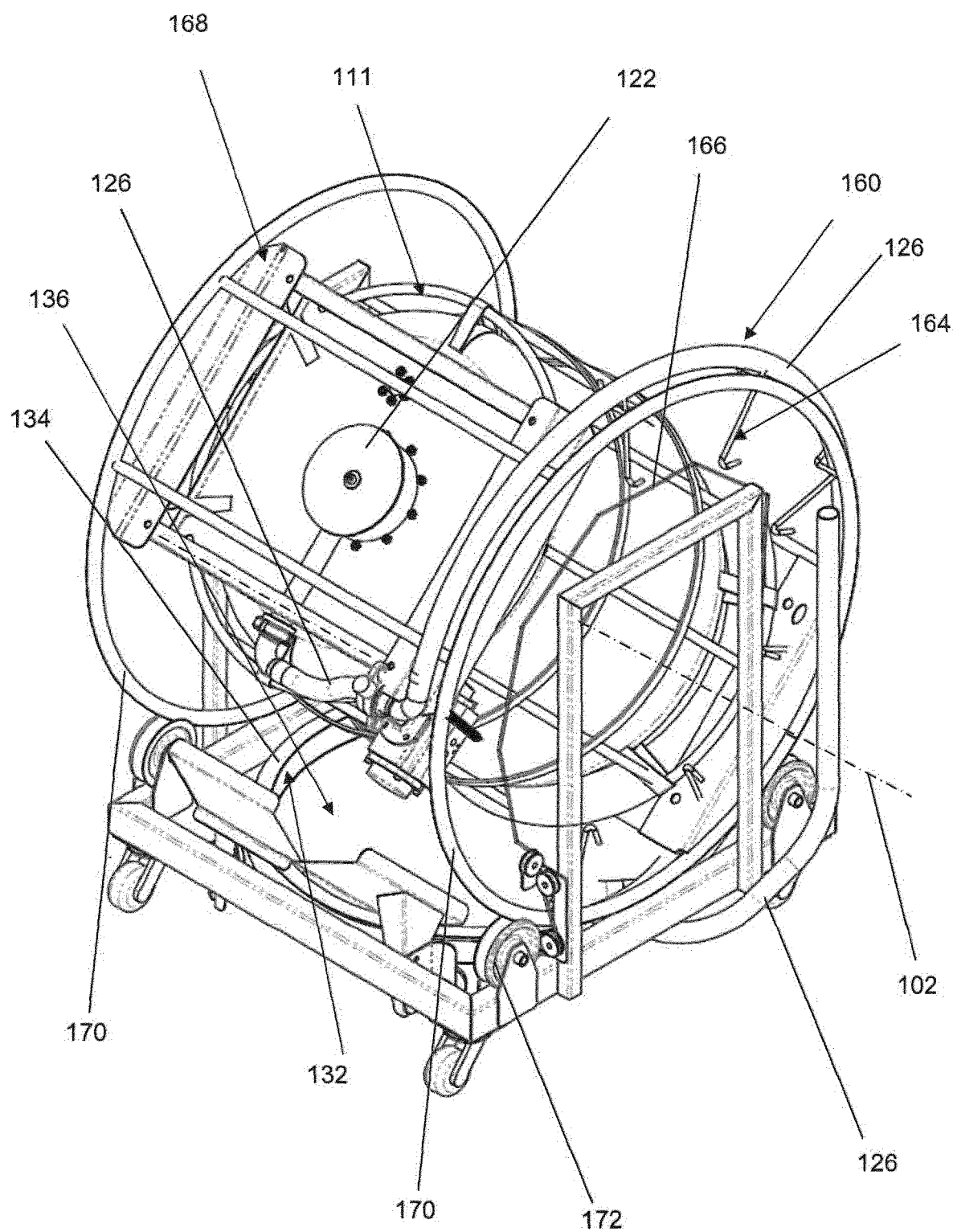
FIG. 2 shows a side view of the arrangement from FIG. 1 after it has been pivoted counter-clockwise by approximately 225°.
Figure 3:
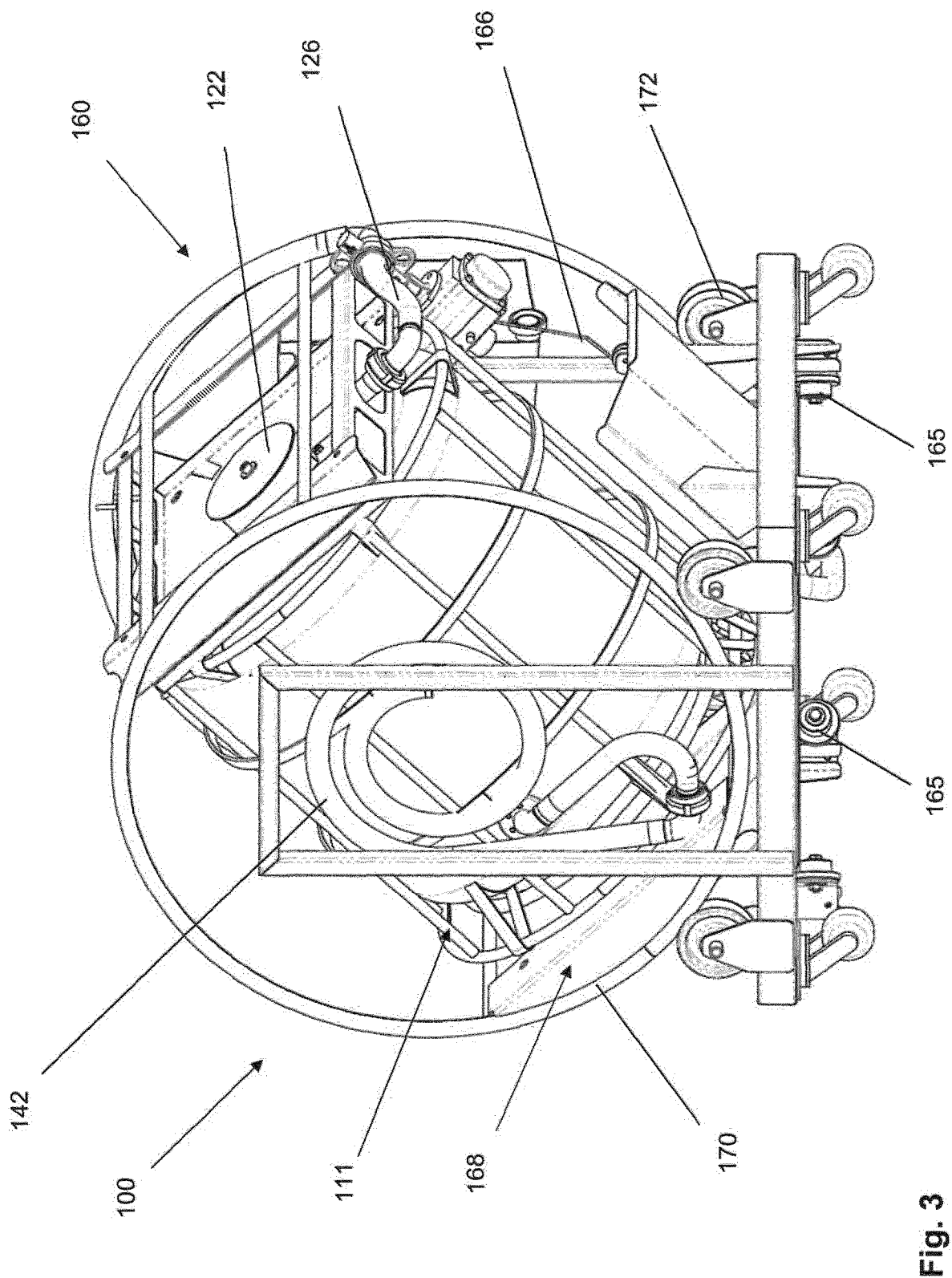
FIG. 3 shows a view of the opposite side of the arrangement from FIG. 2.
Figure 4:
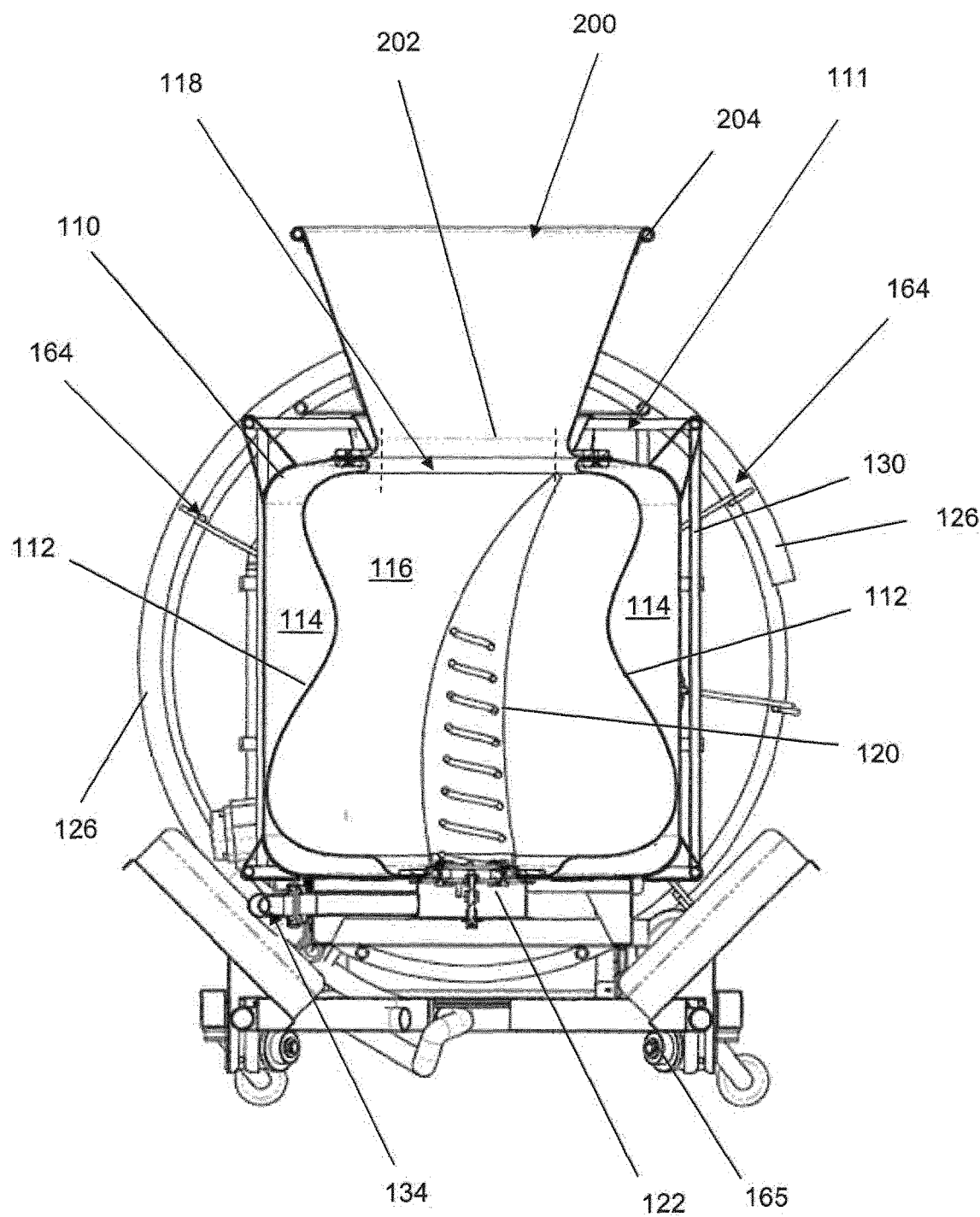
FIG. 4 shows a schematic cross-sectional view of the arrangement with a press container accommodated in a turning unit, with an installed funnel-shaped closure lid and press membrane and drainage element indicated.
Figure 5:
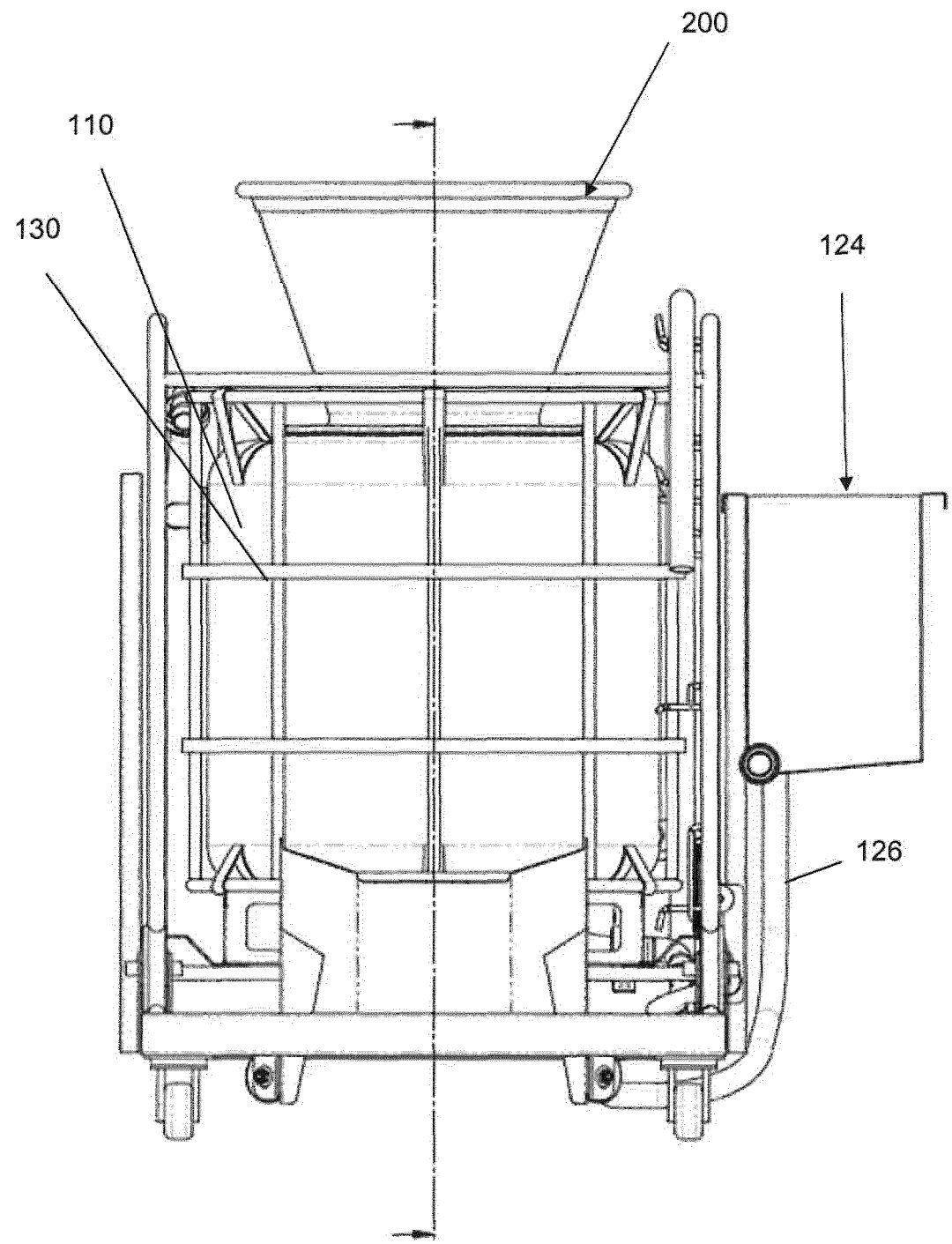
FIG. 5 shows a side view of the arrangement according to the invention from FIG. 4.
Figure 6:
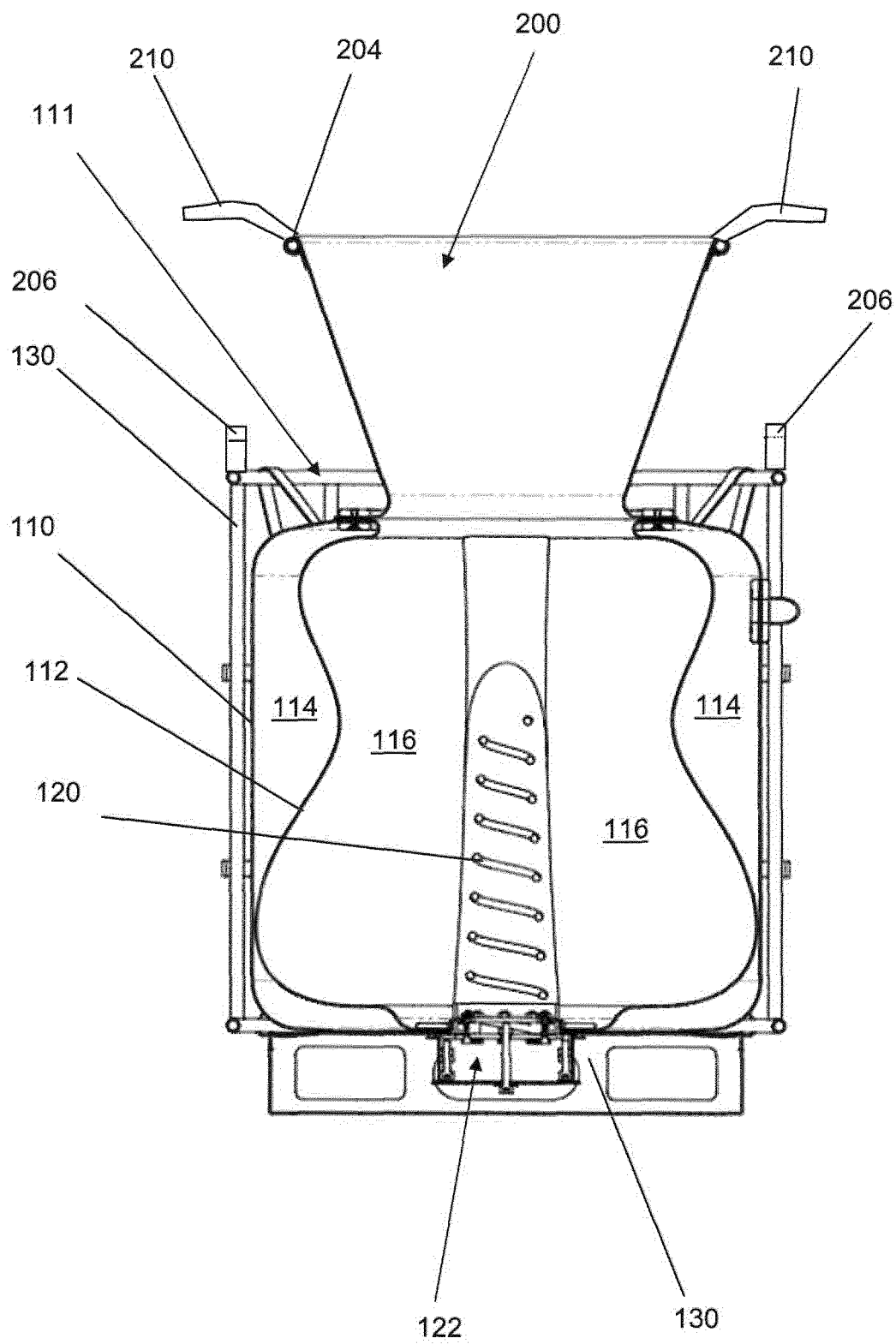
FIG. 6 shows a schematic cross-sectional view of the mobile press container, designed as a transportable unit, with the closure funnel open before being filled with pressing material.
Figure 7:
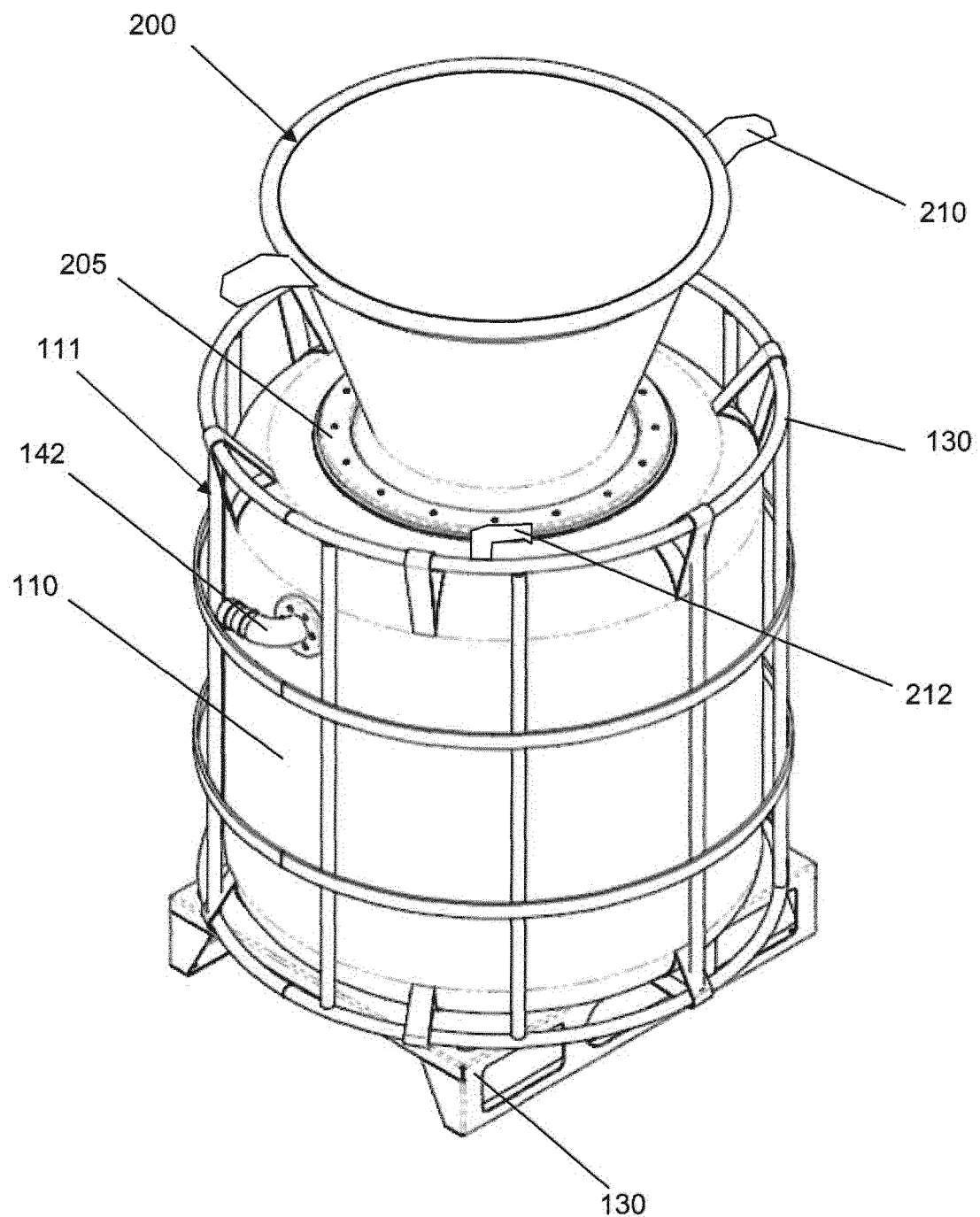
FIG. 7 shows a schematic three-dimensional view of the transportable mobile press container from FIG. 6.
Figure 8:
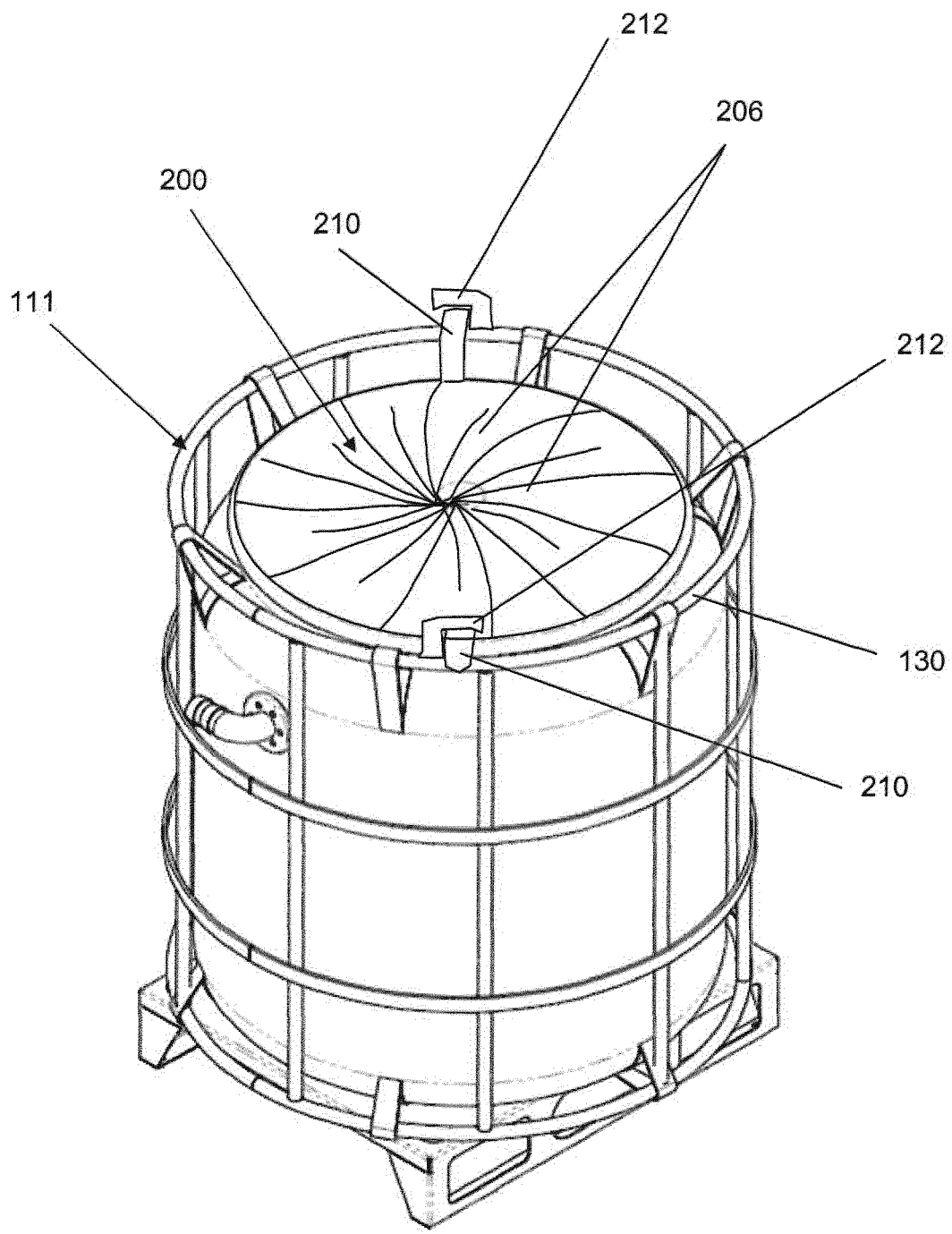
FIG. 8 shows the press container from FIG. 7 in the closure position after rotating the upper edge of the closure funnel counterclockwise and hooking the wing-like tabs into the hook-shaped engagement elements on the support framework.
Figure 9:
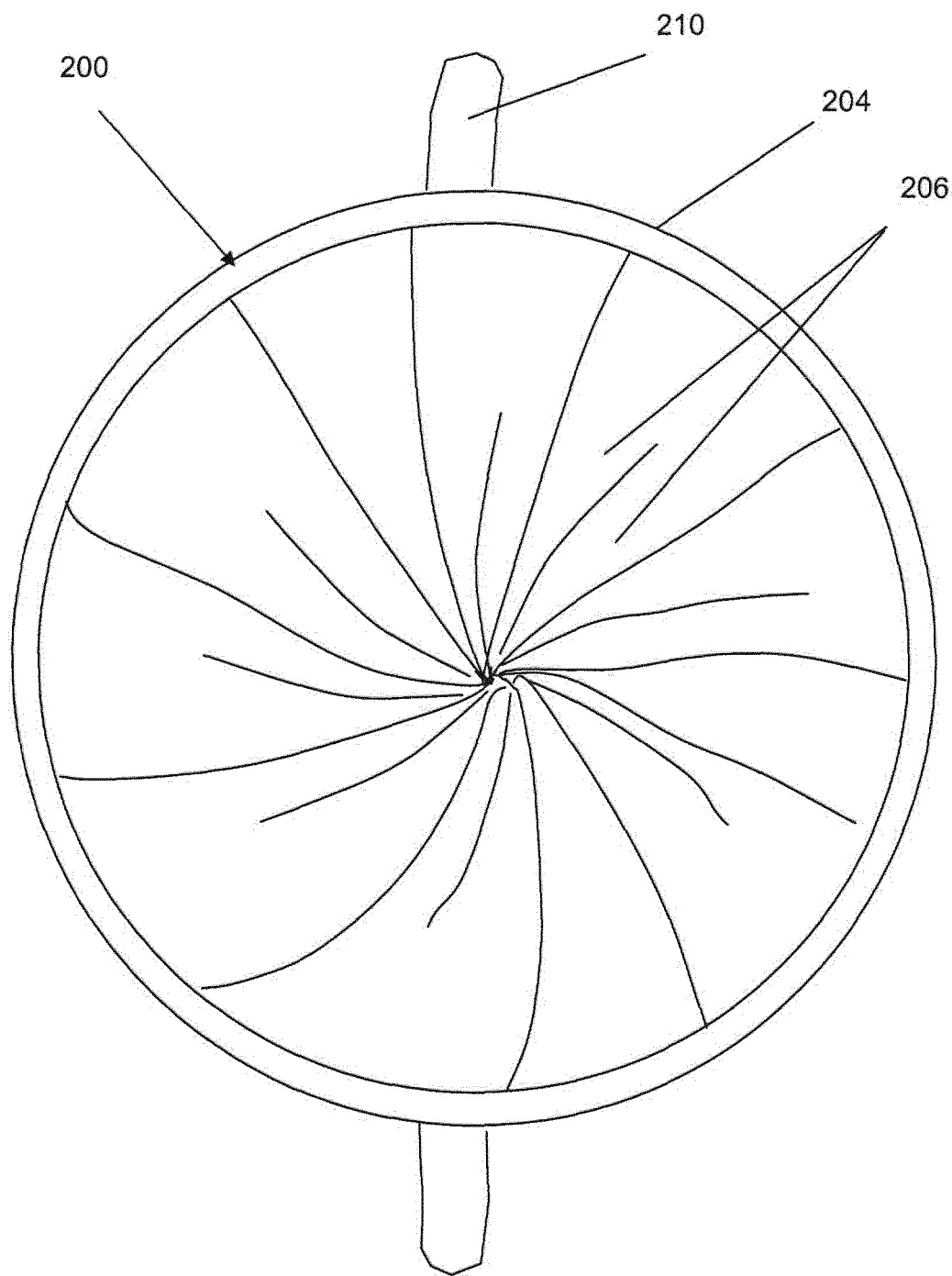
FIG. 9 shows a top view of the closed closure funnel to clarify the overlapping wall sections.
Figure 10:
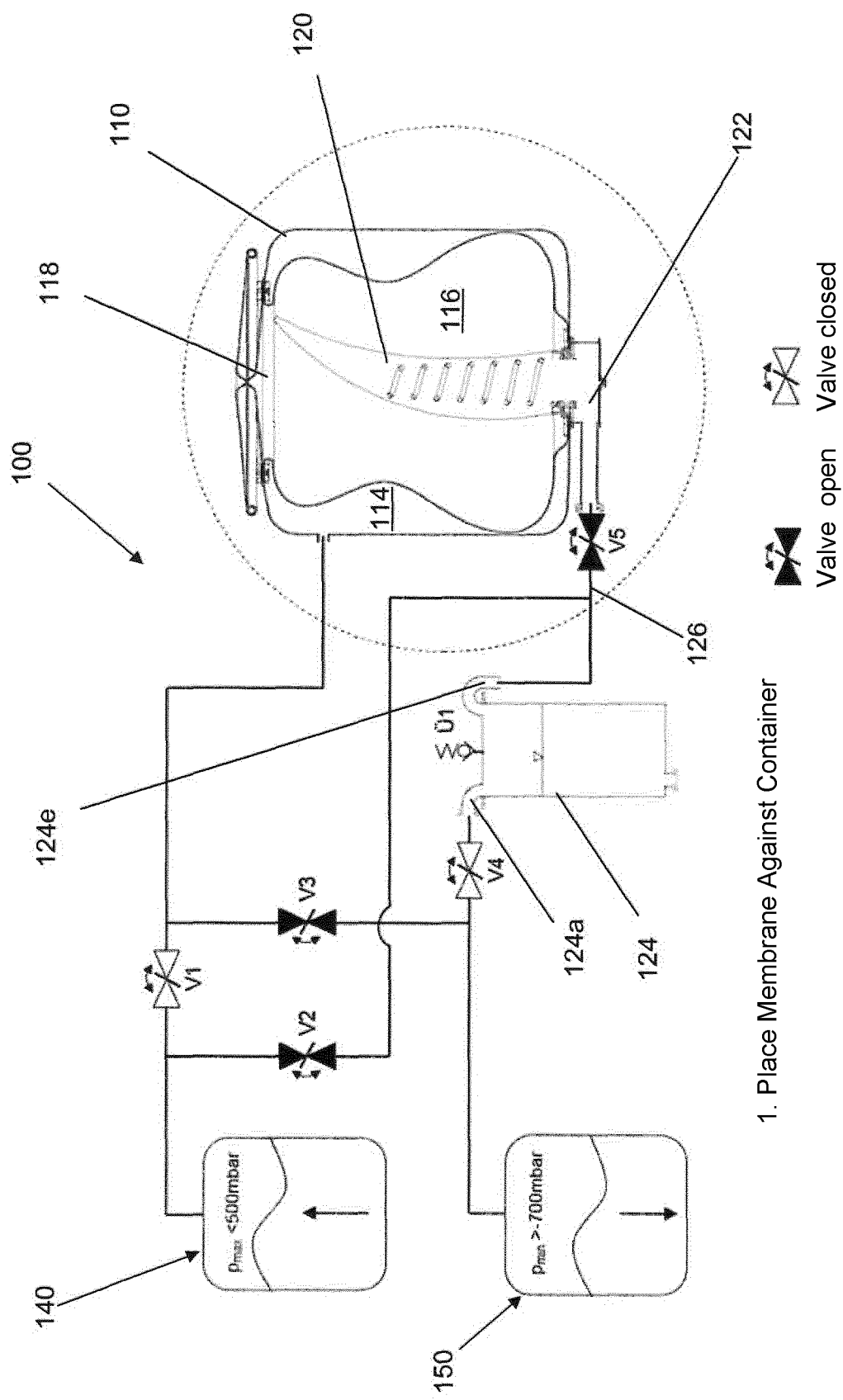
FIG. 10 shows a schematic illustration of the line arrangement and valve position for the supply of negative pressure and positive pressure when applying the press membrane.

As shown in FIGS. 1 to 12, an arrangement 100 for pressing liquid-containing substances, such as grapes or fruit, comprises a press container 110 which is rotatable about an axis of rotation 102 and the interior of which is divided by a press membrane 112 into a pressure medium chamber 114 and a pressing medium chamber 116. A filling and emptying opening 118 which is closable in a pressure-tight manner is arranged in the press container 100, via which opening the liquid-containing pressing material can be introduced into the pressing medium chamber 116. At least one drainage element 120 shown in FIGS. 4 and 6 is arranged in the pressing medium chamber 116, the interior of which communicates with a juice outlet 122 of the press container 110, via which liquid juice is fed to a juice collecting container 124 during a pressing operation, as indicated in FIG. 10, for example.

Figure 1:
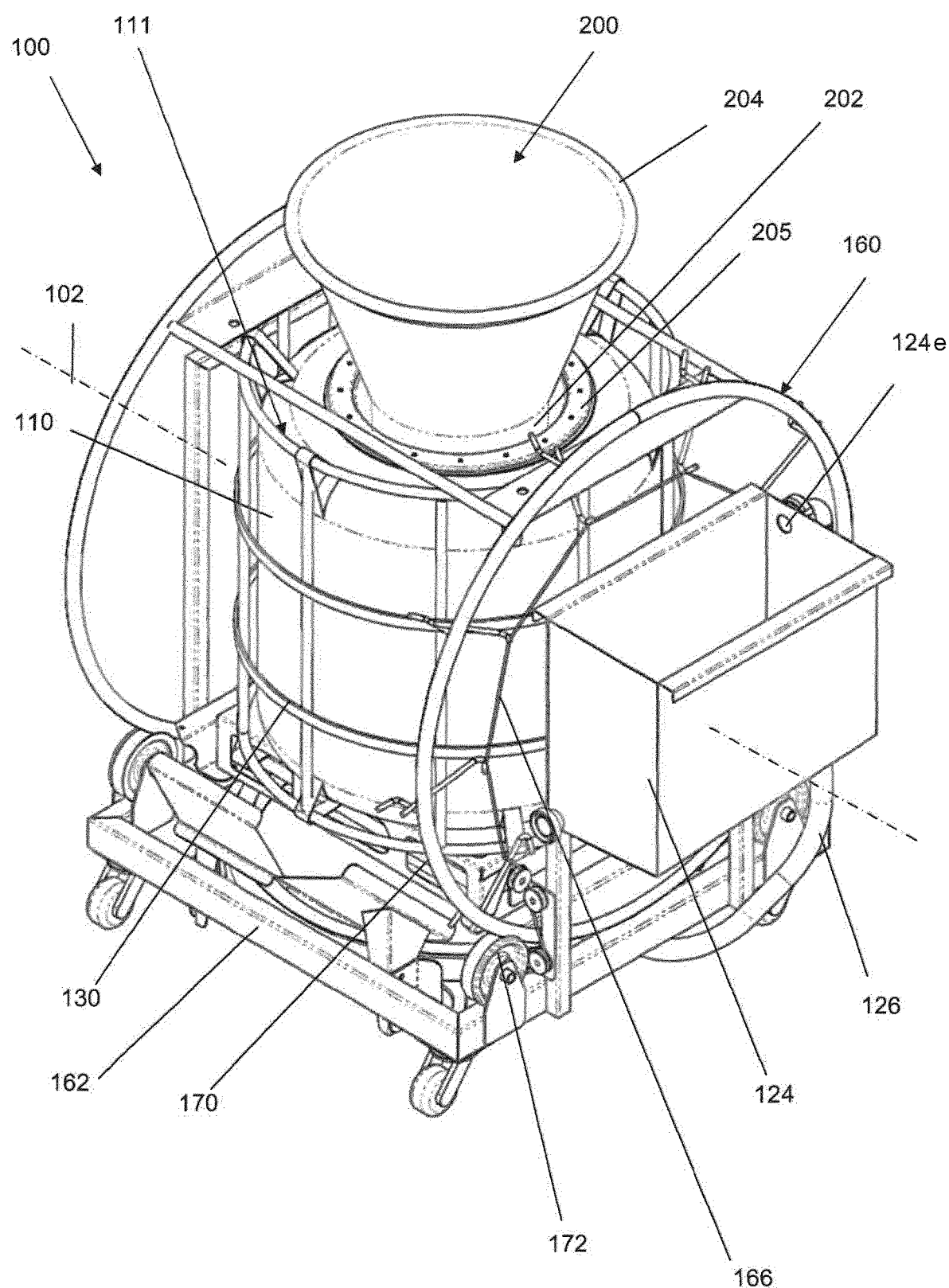
FIG. 1 shows a schematic spatial illustration of the arrangement according to the invention in the pressing and filling position.

According to the invention, the press container 110 consists of a pressure-resistant and liquid-impermeable flexible plastics material, in particular a coated, air-impermeable plastics or textile fabric, such as is used, for example, for truck tarpaulins or else for the press membranes of the known membrane presses. However, the material can also be a plastics-coated, single-layer or multi-layer fabric material which is known from so-called stand-up paddling boards and which can withstand pressures of 1.5 bar and more. The pressure-resistant, flexible plastics material is shaped by corresponding sewing and/or adhesive bonding to form a bag-like closed container 110, which in the expanded state preferably has the shape of a barrel or a sphere, as indicated in FIGS. 1 and 6. The pressure-resistant container 110 made of flexible plastics material is accommodated in a preferably basket-like support framework 130, which can be rotated in opposite directions of rotation about an axis of rotation 102 indicated in FIG. 2 via a motor that is not shown specifically.

The arrangement 100 has a positive pressure source 140 which is connectable to the pressure medium chamber 114 via a compressed air supply line 142 and via which the pressure medium chamber 114 can be charged during a pressing operation with a positive pressure which according to the invention is limited to a maximum of 0.5 bar. This eliminates the time-consuming ongoing pressure tests that are required for pressure containers for safety reasons if they are charged with a positive pressure of more than 0.5 bar.

In order nevertheless to achieve a sufficiently high compression pressure of more than 1 bar in the pressing medium chamber 116, into which the liquid-containing product to be pressed, e.g. grapes, is introduced, with which compression pressure the press membrane 112 presses on the product, which is required in a known way in membrane presses to expel a sufficient amount of juice from the product, the arrangement 100 further comprises a negative pressure source 150. The latter charges the pressing medium chamber 116, when positive pressure is applied, simultaneously with a negative pressure of between −0.1 to −0.9 bar, with the level of the positive pressure in the pressure medium chamber 114 and the negative pressure in the pressing medium chamber 116 being selected depending on the respective pressing material and the number of previous pressing operations during a press cycle, as is known from membrane presses. Between two pressing operations of a pressing cycle, the press container 110 is rotated from the filling position shown in FIG. 1 in the forward and backward direction about the axis of rotation 102 in order to loosen the residual pressing material remaining in the press container 110 and to feed the juice contained therein to the drainage element 120, through the sieve fabric of which the juice then, as is known, enters the juice outlet 122, via which it is fed to the juice collecting container 124, in particular is sucked into it.

As has been recognized by the applicant, the above-described principle according to the invention of charging the pressing medium chamber with a negative pressure of less than 0 bar and the pressure medium chamber simultaneously with a positive pressure of a maximum of 0.5 bar can be used in principle in all known membrane presses, for example in the presses disclosed in WO 03/035381 A1 that have a metal press container. As a result, in older presses, according to the invention, the complex pressure tests, which lead to considerable maintenance costs over the service life of such a press, can be avoided.

Nevertheless, the principle on which the invention is based is preferably used in connection with membrane presses which have a press container as described above made of a pressure-resistant, flexible plastics material, the juice outlet 122 of which, as shown in FIG. 2, is connected in terms of flow to the juice collecting container 124 during a pressing operation via a flexible, negative-pressure resistant hose 126 in order to avoid the expensive and difficult-to-clean rotary feedthroughs that are otherwise required in the presses of the prior art with a horizontal press container for draining the liquid and very sugary juice from the juice outlet 122 to the juice collecting container 124.

In a preferred embodiment of the invention, the juice collecting container 124 is connected to the negative pressure source 150 for generating the negative pressure in the pressing medium chamber 116 during a pressing operation, which negative pressure source is in particular a membrane pump which has a flushable chamber and generates the negative pressure directly. In the preferred embodiment of the invention, however, the arrangement comprises a double membrane pump (not shown), the suction side of which forms the negative pressure source 150 and the pressure side of which forms the positive pressure source 140. As a result, the need for pumps to generate the positive pressure and negative pressure can advantageously be reduced by half.

Alternatively, the negative pressure source 150 can be a known peristaltic pump which acts mechanically on a flexible or elastic hose section which is connected to the juice outlet 122 and which is either a partial section of the flexible hose 126 or else an elastic hose section which is integrated specifically for this purpose in the feed line to the juice collecting container 124 and is resistant to negative pressure, in order to convey the liquid juice and the air located in the pressing medium chamber 116 from the juice outlet 122 into the juice collecting container 124 during a pressing operation.

In a preferred embodiment of the invention, the positive pressure source 140, as shown in FIG. 10, can be connectable in terms of flow to the pressing medium chamber 116 via a first valve V1 and a first supply line to the pressure medium chamber 114 and via a branch arranged between the positive pressure source 140 and the first valve V1 and also a second positive pressure line leading from the branch to the pressing medium chamber 116 and blockable by a second valve V2. The negative pressure source 150 is also connectable to an air suction opening 124a in the juice collecting container 124 via a fourth supply line and a fourth valve V4 arranged in this line; and in the juice collecting container 124, which is designed as a negative pressure container, a juice inlet opening 124e is preferably formed above the liquid level, which can be connected to the pressing medium chamber 116 via a fifth supply line which is blockable by a fifth valve V5, as shown in FIG. 11, which shows the valve position of the valve arrangement described above during simultaneous pressing with positive pressure of <0.5 bar in the pressure medium chamber and negative pressure of 0 to 950 mbar in the pressing medium chamber 116.

According to a further embodiment, it can also be provided that the second positive pressure line is connectable to the positive pressure source 140 via a second branch arranged in the fifth supply line and the second valve V2, and the first positive pressure line is connectable in terms of flow to the negative pressure source 150 via a third branch arranged between the first valve V1 and the pressure medium chamber 114 and a third supply line which is blockable by a third valve V3 in order to charge the pressing medium chamber 116 with a positive pressure when the first valve V1 and fourth valve V4 are closed and the second valve V2, third valve V3 and fifth valve V5 are open for applying the press membrane 112 onto the inner wall of the flexible press container 10, as shown in FIG. 10, before pressing material is introduced therein. Owing to this position of the valves V1 to V5 indicated in FIG. 10, air is sucked out of the pressure medium chamber 114 via the valve V3 and at the same time the pressing medium chamber 116 is charged with compressed air or alternatively inert gas at low pressure via the valves V2 and V5 such that the contour of the container outer wall is retained. At the same time, the vacuum present between the press membrane 112 and the inner wall of the flexible press container 110 forms a very rigid unit between them, which stabilizes the press container 110 and makes it considerably easier to introduce the pressing material through the press membrane 112, which is arranged outside the filling region, despite the flexible container material, as the applicant was able to recognize in experiments.

To carry out a pressing operation, the valves V1 to V5 are moved from the basic position, not shown, in which all the valves are closed, into the position shown in FIG. 10 in order to place the press membrane 112 against the inner wall of the container, as previously described. In this case, clean compressed air and not compressor air is introduced into the pressure medium chamber from a buffer tank, not shown, or directly by a blower or a large-volume membrane pump as a positive pressure source 140 with a maximum of 500 mbar. The negative pressure is supplied, for example, from a negative pressure buffer tank, not shown, or is generated directly by a previously described membrane pump with a chamber, which is preferably flushable, as the negative pressure source 150. Furthermore, the juice collecting container 124 can have a positive pressure valve Ü1 indicated in FIGS. 10 to 12 in order to derive a positive pressure generated by the open valve V2 in the juice collecting container when the valves V1 to V5 are in the position indicated in FIG. 10.

Figure 11:
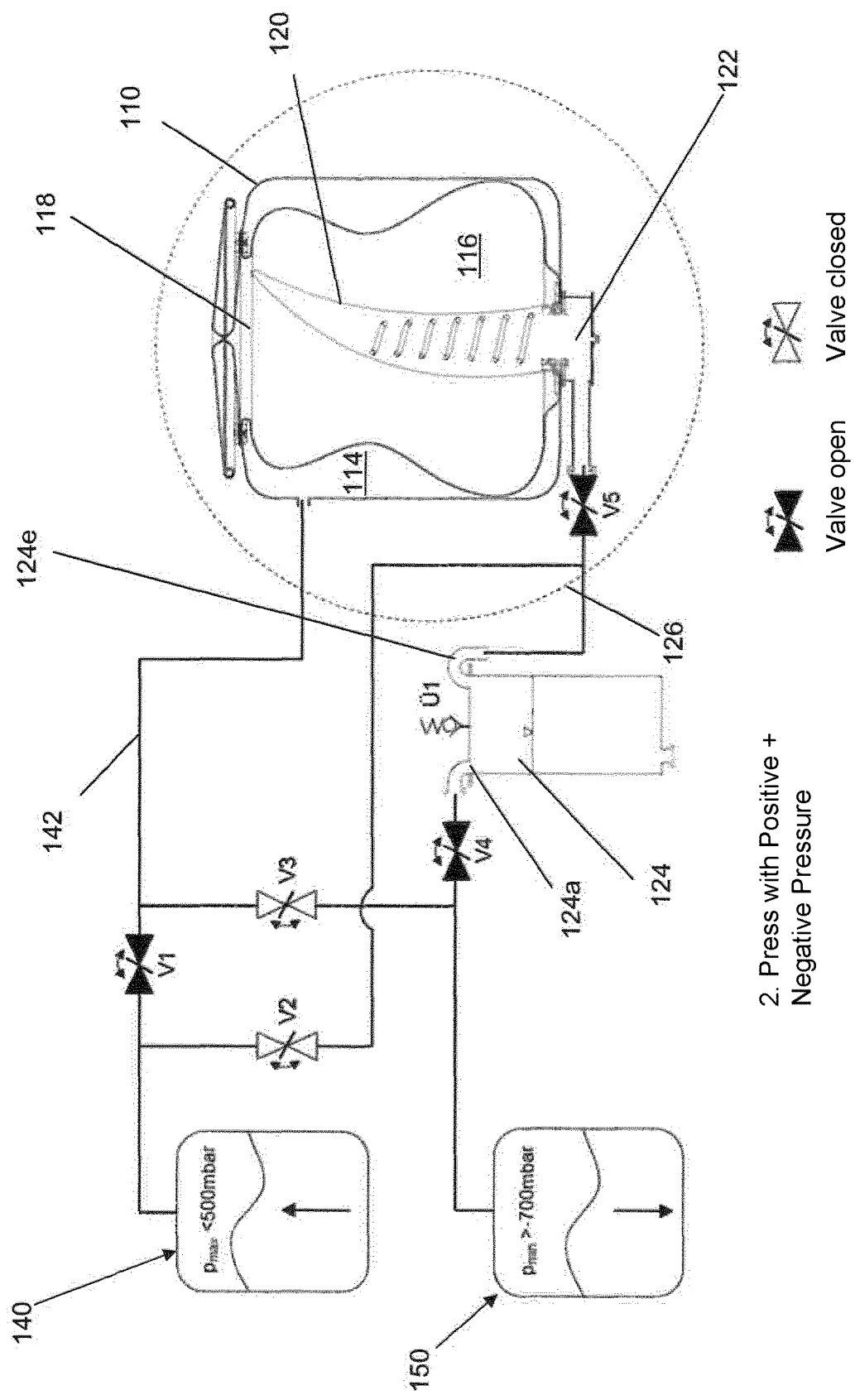
FIG. 11 shows a schematic illustration of the line arrangement and valve position during the pressing operation with negative pressure and positive pressure.

FIG. 11 shows the valve position during pressing with simultaneous positive pressure and negative pressure, in which valve position compressed air is conducted via the valve V1 into the pressure medium chamber and negative pressure is applied to the pressing medium chamber 116 via valves V4 and V5, such that juice and air located in the pressing medium chamber are sucked into the juice collecting container 124 and separated there. If, in this case, little juice enters the flexible hose 126 at the end of a pressing cycle during a pressing operation, said juice is no longer conveyed since a sufficient change in volume no longer takes place.

Figure 12:
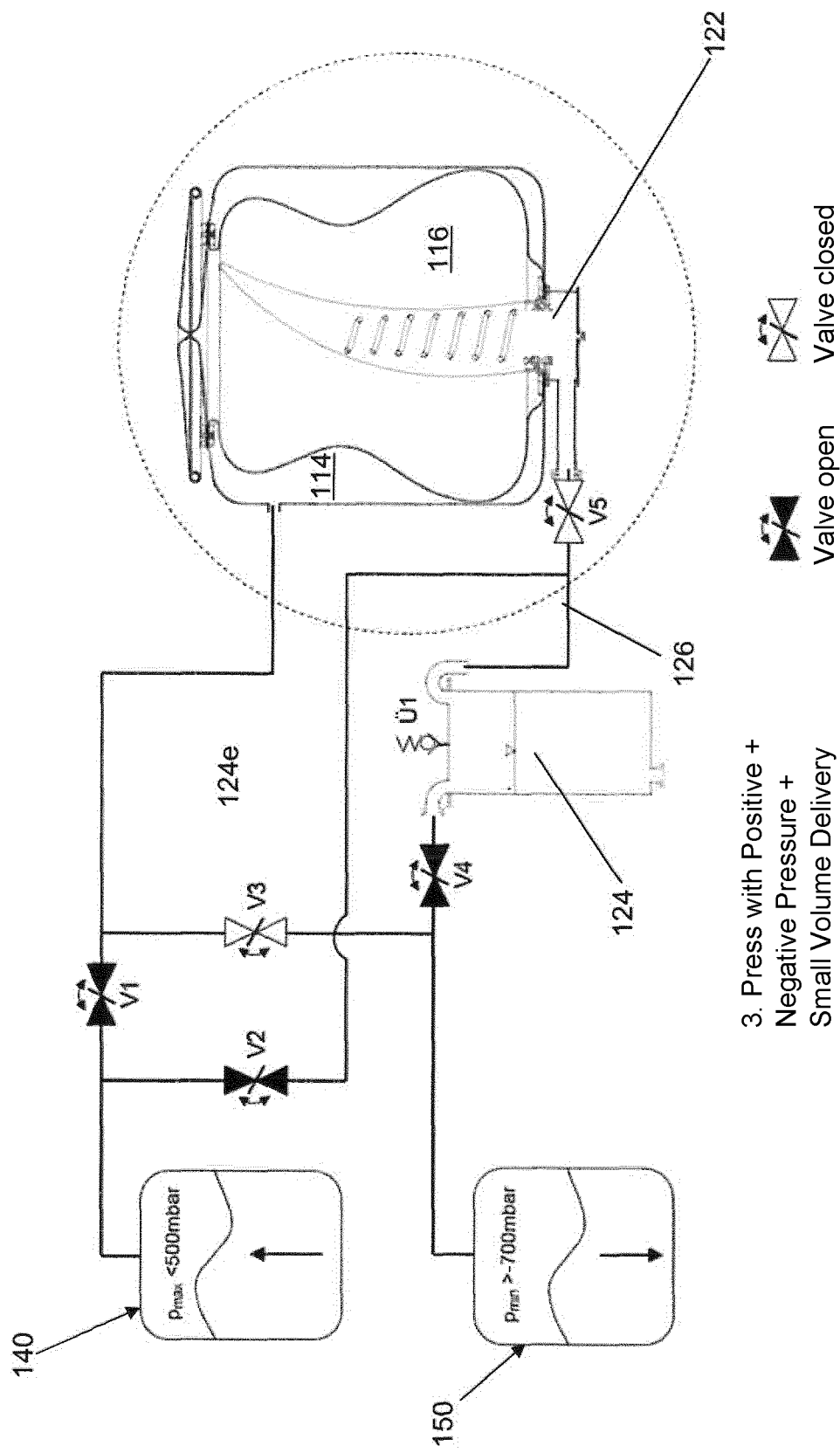
FIG. 12 shows a schematic illustration of the line arrangement and valve position during the pressing operation with reduced juice flow.

In this case, the pressing takes place in the subsequent pressing operation with a position of the valves V1 to V5 indicated in FIG. 12.

In the case of small amounts of juice, which are detected, for example, by liquid sensors in the juice collecting container 124, the amount of juice located in the flexible juice hose 126 is sucked into the juice collecting trough 124 by repeatedly closing valve V5 and opening valve V2 at the same time, or alternatively it is pressed therein while closing valve V4 at the same time.

In a preferred embodiment of the invention, the preferably basket-shaped support framework 130 and the press container 110 made of flexible plastics film material which is accommodated therein and held thereon by loops, not denoted specifically, form a mobile press and transport container 111, which can be stored and transported independently as a unit, such that it is parked in a vineyard, filled with grapes or fruit by hand via the filling and emptying opening 118 and, after the filling and emptying opening 118 has been closed with a conventional, solid, pressure-resistant closure lid or the funnel-shaped closure lid 200, described in more detail below, can be brought for pressing in a winery or the like. Such a mobile press and transport container 111 closed with a funnel-shaped closure lid 200 is shown in FIG. 8 by way of example.

The filled mobile press and transport container 111, which is closed at its top by the lid 200, is then preferably picked up with the aid of a forklift, for which purpose two openings, not denoted specifically, can be formed on the bottom of the support framework 130, into which the lifting forks of a forklift can be inserted, in order to lift the filled mobile press and transport container 111 including the support framework 130 and push it sideways into a turning device 160 shown in FIG. 1.

In the turning device 160, the mobile press and transport container 111 is then rotated, after a pressing operation, to loosen the pressing material from a filling position which is shown in FIG. 1 and which also corresponds to the juice extraction position during a pressing operation, in which the filling and emptying opening 118 is located at the top of the container 111, by a limited angle of rotation of preferably in each case less than 360°, in particular by less than 270°, in mutually opposite directions of rotation about an axis of rotation 102, as indicated in FIGS. 2 and 3.

In order, after inserting the support framework 130 with the filled flexible press container 110 accommodated therein, i.e. the mobile press and transport container 111, into the turning device 150, to maintain a permanent line connection between the juice outlet 122 and the juice collecting container over an entire pressing cycle with up to 10 pressing operations and rotations, at the beginning of a pressing cycle, the juice outlet 122 is connected via a known hose coupling to the flexible and negative-pressure resistant hose 126, the upstream end of which is coupled to the juice inlet opening 124e of the juice collecting container.

This permanent coupling of the juice outlet 122 to the juice collecting container 124 via the flexible hose 126 during a complete pressing cycle means that the pressed liquid juice does not or virtually does not come into contact with the ambient air and the dirt and dust particles or insects contained therein, as a result of which the quality of the grape juice obtained—and accordingly of the wine made from it—is significantly increased.

In order to track the flexible hose 126 during the pivoting of the press container 110 in the turning device 150 according to the currently selected angle of rotation, the turning device 150 comprises a retraction device 132 for receiving the flexible hose 126. The retraction device 132 has a hose receiving drum 134 which is arranged below the juice outlet 122 and has a passage opening 136. The pressed pressing material (pomace) is poured through the latter after the last pressing operation at the end of a pressing cycle with the filling and emptying opening 118 open after the press container 110 has rotated into an emptying position, in which the filling and emptying opening 118 is located on the underside of the press container 110, into a drip pan or the like which is not specifically shown. The horizontal arrangement according to the invention of the tire-like hose receiving drum 134 below the juice outlet 122 results in the advantage that the retraction device 132 is arranged at a neutral height, the flexible hose 116 is not in the way when emptying the pomace, and the juice outlet 122 is always at the lowest point of the turning device 160 during pressing and, as a result, the hose volume can also be used as a buffer reservoir for the juice.

The hose receiving drum 134 is accommodated so as to be rotatable in a horizontal plane on the turning device 160, in particular on its supporting frame 162, via rollers 165, which can be seen in FIG. 3. Also provided in the turning device 150 is a hose guiding device 164 which is arranged coaxially to the axis of rotation 102 of the press container 110 and is preferably coupled in a rotationally fixed manner to the receptacle of the turning device 160 and along which the flexible hose 126 is moved when the press container 110 is pivoted about the axis of rotation 102. The hose receiving drum 134 of the retraction device 132 is mechanically coupled to the hose guiding device 164 via a traction cable 166, which is pretensioned in particular by a spiral tension spring and deflected via rollers, and which converts the rotational movement of the press container 110 in the turning device 160 into a corresponding rotational movement of the hose receiving drum 134, such that the flexible hose 126 wound onto the hose receiving drum 134 in the opposite direction to the hose guiding device 164 is moved in a defined manner along the hose guiding device 164 when the press container 110 is pivoted in the turning device 160. At the same time, the mechanical coupling of the rotational movement of the container 110 with the rotational movement of the hose receiving drum 134 applies an opposing tensile force to the hose portion located outside of the hose guiding device 164, thereby tensioning and holding the flexible hose 116 on the hose receiving drum 134.

As already explained above and as shown in FIGS. 1 to 3, the turning device 160 comprises a supporting frame 162, which is preferably arranged on pivotable castors, and a receiving device 168, which is rotatable relative to said supporting frame about the axis of rotation 102 and into which the mobile press and transport containers 111 are insertable from the side. For this purpose, the rotatable receiving device 168 has two rotary rings 170 which are arranged coaxially to the axis of rotation 102 and which are coupled in a rotationally fixed manner to the receiving device 168 and, as shown in FIGS. 1 to 3, are supported via four support rollers 172 arranged on the supporting frame 162 in order to rotatably support the receiving device 168 with a mobile press container 110, which is inserted into the latter, on the supporting frame 162. The angle of rotation of less than 360° in each of the two directions of rotation can be limited by a stop, not shown specifically, which can preferably be arranged adjustably on one of the rotating rings 170 and which interacts with a counter-stop, not shown specifically, on the supporting frame 162.

As furthermore shown in FIGS. 1 and 5, in the preferred embodiment of the invention, the juice collecting container 124 is advantageously located above the juice outlet 122, and in particular is fastened to the supporting frame of the turning device 160. This results in the advantage that the juice collected in the juice collecting container during a pressing cycle can then be introduced purely gravitationally into another main collecting container, not shown specifically, without the need for an additional pump.

Finally, in a particularly preferred embodiment of the invention, it can be provided that the filling and emptying opening 118 of the press container 110 is closable by a funnel-shaped closure lid 200 which is shown in FIGS. 1, 4, 5, 6 and 7 and which is connected non-rotatably to the filling and emptying opening 118 on its underside, in particular via a flange 205. The closure lid 200, which can be used not only in the arrangement according to the invention with a flexible press container 110, but which is also usable in principle for conventional press containers made of metal or elastic thicker-walled plastic, consists of a flexible material, preferably a non-stretchable rubber-elastic material, such as fabric-reinforced rubber or silicone. As indicated in FIGS. 1, 4, 5 and 7, the funnel-shaped closure lid 200 can be moved from an open funnel-shaped filling position shown there, in which a through-channel 202 in the funnel-shaped closure lid 200 is opened up, by rotating the upper edge 204 circumferentially relative to the press container 110 or to the flange 205, and lowering the upper edge 204 into a closure position in which the through-channel 202 is closed by overlapping wall sections 206 of the funnel-shaped closure lid 200, as shown in FIGS. 8 and 9. In order to lock the funnel-shaped closure lid 200 in the closure position shown in FIGS. 8 and 9 after rotating the upper edge 204 facing away from the filling and emptying opening 118 (counter-clockwise in FIG. 7) into said closure position, wing-like tabs 210, which engage in hook-shaped engagement elements 212 on the support framework 130 of the container 111, can be fastened to the upper edge 204 of the funnel-shaped closure lid 200, which can be reinforced by an incorporated metal ring. As has been found by the applicant, the twisting of the elastic material of the funnel-shaped closure lid 200 results in a highly pressure-tight closure of the through-channel 202, which effectively prevents the ingress of ambient air when negative pressure is applied to the product medium chamber 116 during a pressing operation.

Another advantage of the elastic funnel-shaped closure lid 200 can be seen in the fact that it can remain on the container 111 even when using the mobile press container 110 as a collecting and transport container 111 in the vineyard in order to facilitate the introduction of the grapes or fruit without a separate funnel being required.

As is furthermore shown in FIG. 13, according to another concept on which the invention is based, the mobile press container 110 accommodated in the support framework 130 made of flexible plastics material in the embodiment as a mobile press and transport container 111, as has previously been described with reference to FIG. 8, can be surrounded by a protective container 300 accommodated within the support framework 130, in which the press container 110 made of pressure-resistant, flexible plastics material, in particular from a multi-layer, flexible, airtight plastics fabric, is accommodated. As is indicated in FIG. 13, vent holes 310 are preferably formed in the protective container 300, which is composed of a known inherently rigid plastics material such as PVC, through which air can escape or flow in when the press container 110 expands and relaxes.

The protective container 300 is preferably a cube-shaped or cuboid standard container, which is known as an "IBC container" in agriculture, and which has a forklift mount on the bottom and a support framework 130 made of tubular steel which surrounds the protective container 300 and through the top-side opening 320 in which the in this case bag-like flexible press container 110 with the press membrane 112 inserted therein is introduced from above. The top-side opening 320 in the protective container 300 can be subsequently expanded for this purpose. The flexible press container 110 preferably has the shape of an upright cylinder, but can also be configured spherically or partially spherically. Furthermore, a flange, not shown specifically, for the juice outlet 122 is incorporated pressure-tightly in the latter on the underside of the bag-like, flexible press container 110 of the embodiment from FIG. 13, to which flange the bottom side of the drainage element 120 is preferably releasably fastened, the latter being able to be fixed at its upper end, e.g. via retaining cords, to the flange, likewise not shown specifically, of the filling and emptying opening 118. By this means, the flexible drainage element 120 is prevented, using simple means, from being deflected during the pressing operation.

Figure 13:
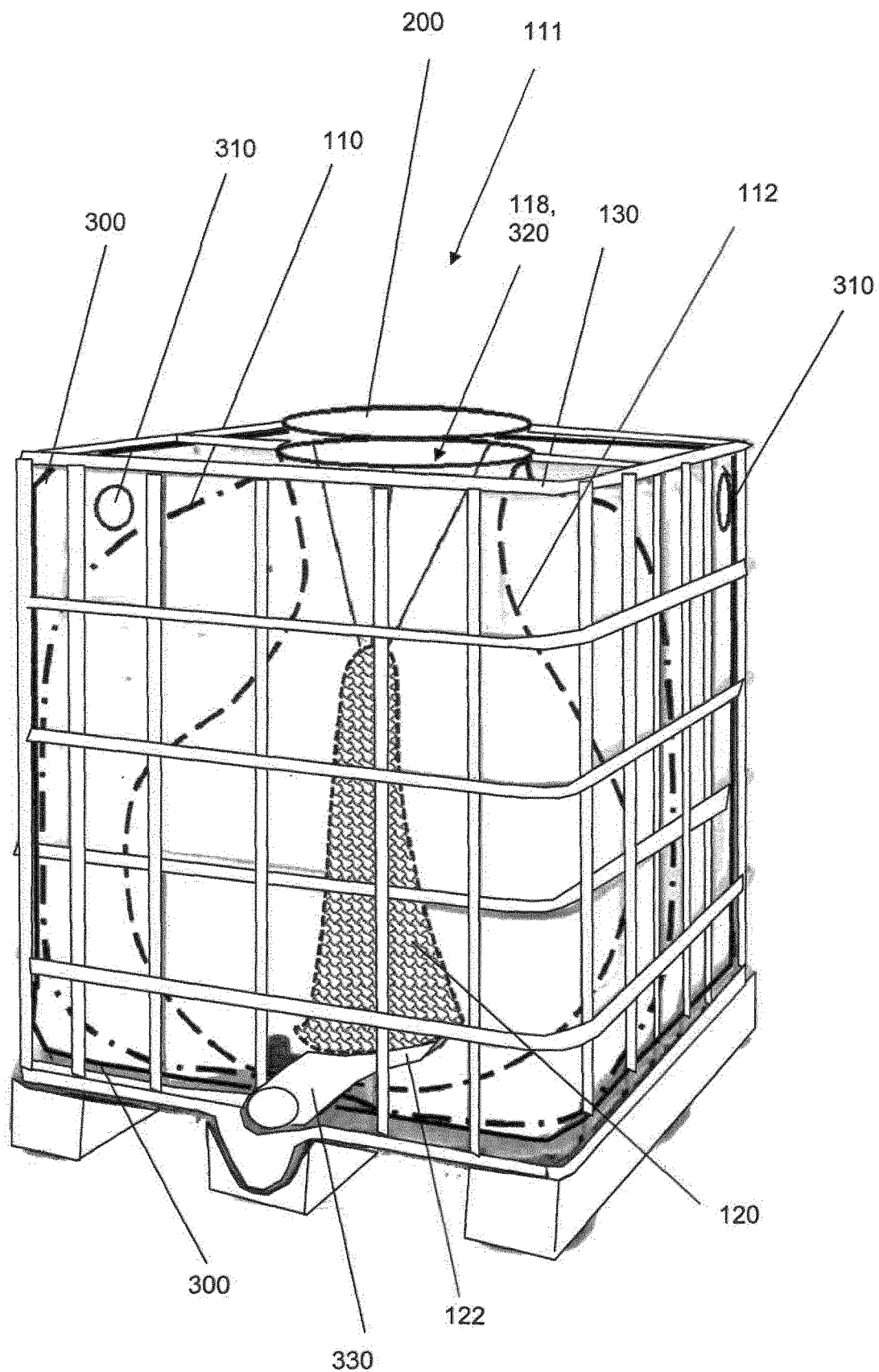
FIG. 13 shows a further embodiment of a flexible press container.

As can also be gathered from the illustration of FIG. 13, the outlet pipe 330 mounted on the standardized IBC containers can be connected in terms of flow to the juice outlet 122 in order to use the outlet valve used in the standardized IBC containers for closing and opening up the juice outlet 122. The embodiment described above has the advantage that the standardized and highly cost-effective IBC containers can be used as the basis for the mobile press containers, with the cube-shaped or cuboid plastics container, which is usually not sufficiently pressure-resistant, being used in an advantageous manner as an additional protective container which, in the event of the flexible, pressure-resistant (bag-like) press container bursting open, absorbs and damps the pressure energy released, such that the risk of injury to the operating personnel during a pressing operation can advantageously be ruled out in such a situation. The mobile container shown in FIG. 13 is also inserted and pivoted in a turning device adapted to the cuboid or cube shape of the container, as was previously described in connection with the containers from FIGS. 1 to 5.

LIST OF REFERENCE NUMBERS

100 Arrangement according to the invention
102 Axis of rotation
110 Flexible press container
112 Press membrane
111 Mobile press and transport container
114 Pressure medium chamber
116 Pressing medium chamber
118 Filling and emptying opening
120 Drainage element
122 Juice outlet
124 Juice collecting container
124a Air extraction opening in the pressure-tight juice collecting container
124e Juice inlet opening in the pressure-tight juice collecting container
126 Flexible hose
130 Support framework
132 Retraction device for flexible hose
134 Hose receiving drum
136 Passage opening in the hose receiving drum
140 Positive pressure source
142 Compressed air supply line
150 Negative pressure source
160 Turning device
162 Supporting frame
164 Hose guiding device 165 Rollers for storing the hose receiving drum
166 Traction cable
168 Rotatable receiving device for press container in turning device
170 Rotary rings
172 Support rollers for mounting the receiving device
200 Funnel-shaped closure lid
202 Through-channel in the funnel-shaped closure lid
204 Edge of the funnel-shaped closure lid
206 Overlapping wall sections
210 Wing-like tabs on the top edge of the funnel-shaped closure lid
205 Flange
212 Engagement elements on containers for receiving the wing-like tabs in closure position
300 Protective container
310 Vent opening in the protective container
320 Top-side opening in the protective container
330 Outlet pipe
Ü1 Positive pressure valve
V1 First valve
V2 Second valve
V3 Third valve
V4 Fourth valve
V5 Fifth valve

The invention claimed is:

1. An arrangement for pressing liquid-containing raw materials, the arrangement comprising:
an inherently rigid support framework disposed to be rotatable about an axis of rotation;
a press container composed of a pressure-resistant flexible plastics material, said press container being accommodated in said rigid support framework and being rotatable together with said rigid support framework about the axis of rotation;
a press membrane dividing an interior of said press container into a pressure medium chamber and a pressing medium chamber;
said press container being formed with a filling and emptying opening which is closable in a pressure-tight manner and which is configured for receiving the liquid-containing raw materials into said pressing medium chamber; and
at least one drainage element arranged in said pressing medium chamber, said at least one drainage element having an interior communicating with a juice outlet of said press container for delivering liquid juice to a juice collecting container during a pressing operation.

2. The arrangement according to claim 1, wherein said press container is composed of a flexible, two-layer or multi-layer plastics-coated pressure-resistant fabric material.

3. The arrangement according to claim 1, further comprising a positive pressure source configured to exclusively charge said pressure medium chamber with a positive pressure of up to 1.5 bar during the pressing operation.

4. The arrangement according to claim 3, wherein said pressure medium chamber is charged with a pressure of up to 1.2 bar during the pressing operation.

5. The arrangement according to claim 1, further comprising:
a positive pressure source connectable to said pressure medium chamber and configured to charge said pressure medium chamber with a maximum positive pressure of less than 0.5 bar during a pressing operation; and
a negative pressure source connectable to said pressing medium chamber and configured to charge at least one of said pressing medium chamber or said juice outlet with a negative pressure of between −0.1 to −0.9 bar while said pressure medium chamber is being charged with the positive pressure.

6. The arrangement according to claim 5, wherein:
said positive pressure source is connectable to communicate with said pressure medium chamber via a first valve and a first supply line leading to said pressure medium chamber;
said positive pressure source is connectable to communicate with said pressing medium chamber via a branch line connected between said positive pressure source and said first valve and a second positive pressure line leading from said branch line to said pressing medium chamber and being blockable by a second valve;
said negative pressure source is connectable to an air suction opening in said juice collecting container via a fourth supply line and a fourth valve arranged therein;
a juice inlet opening in said juice collecting container is connectable to said pressing medium chamber via a fifth supply line which is blockable by a fifth valve, and/or said second positive pressure line is connectable to said positive pressure source via a second branch arranged in said fifth supply line and said second valve;
said first positive pressure line is connectable to communicate with said negative pressure source via a third branch arranged between said first valve and said pressure medium chamber and a third supply line which is blockable by a third valve in order to charge said pressing medium chamber with a positive pressure when said first valve and said fourth valve are closed and said second valve, said third valve, and said fifth valve are open for applying said press membrane onto an inner wall of said flexible press container before the liquid-containing raw materials are is introduced therein.

7. The arrangement according to claim 1, wherein said juice outlet is permanently connected to communicate with said juice collecting container during a pressing operation via a flexible hose.

8. The arrangement according to claim 1, wherein said support framework and said press container accommodated therein form a mobile press and transport container which may be stored and transported independently.

9. The arrangement according to claim 8, which comprises a protective container encasing said press container of said independently storable and transportable mobile press and transport container, and wherein said protective container is formed with vent holes to allow air to escape during an expansion of said press container.

10. The arrangement according to claim 8, further comprising a turning device for temporarily receiving said support framework and said mobile press and transport container, said turning device being configured, after a pressing operation, to rotate said mobile press and transport container in mutually opposite directions of rotation about the axis of rotation by a limited angle of rotation of less than 360° out of a filling position in order to loosen the raw materials.

11. The arrangement according to claim 10, wherein said turning device is configured to loosen the raw materials after the pressing operation by rotating said mobile press and transport container by less than 270° out of the filling position.

12. The arrangement according to claim 10, wherein said turning device comprises a retraction device for receiving a flexible hose that connects said juice outlet with said juice collecting container when said mobile press and transport container is pivoted in said turning device, said retraction device having a hose receiving drum which is arranged below said juice outlet and which has a passage opening through which, after the pressing operation, with the filling and emptying opening open after the mobile press and transport container has rotated into an emptying position, in which the filling and emptying opening is located on an underside of said mobile press and transport container, so that pressed raw materials can escape.

13. The arrangement according to claim 12, wherein said hose receiving drum is accommodated on said turning device so as to be rotatable in a horizontal plane via rollers, wherein a hose guiding device is arranged in said turning device coaxially to the axis of rotation of said press container, along which said flexible hose is moved when the press container is pivoted about the axis of rotation, and wherein said retraction device is mechanically coupled to said hose guiding device via a traction cable which is deflected via rollers and which is configured to convert a rotational movement of said press container in said turning device into a corresponding rotational movement of said retraction device.

14. The arrangement according to claim 13, wherein said traction cable is a pretensioned traction cable.

15. The arrangement according to claim 10, wherein:
said turning device comprises a supporting frame and a receiving device which is rotatable about the axis of rotation relative to said supporting frame and into which said mobile press and transport container is insertable from above or from the side; and
said rotatable receiving device has two rotating rings that are arranged coaxially with the axis of rotation and which are supported via four support rollers arranged on said supporting frame for rotatably mounting said receiving device, with the mobile press and transport container inserted therein, on said supporting frame.

16. The arrangement according to claim 15, wherein said juice collecting container is arranged above said juice outlet.

17. The arrangement according to claim 16, wherein said juice collecting container is mounted to said supporting frame of said turning device.

18. The arrangement according to claim 1, which comprises a funnel-shaped closure lid for closing said filling and emptying opening of said press container, said closure lid being composed of a flexible material and being connected to said filling and emptying opening on an underside thereof, and wherein said closure lid is configured to be brought from an open, funnel-shaped filling position, in which a through-channel in said closure lid is opened up, by circumferentially rotating an edge of said closure lid that faces away from said filling and emptying opening relative to said press container into a closure position, in which said through-channel is closed by overlapping wall sections of said funnel-shaped closure lid.

19. The arrangement according to claim 18, wherein said funnel-shaped closure lid is formed of a rubber-elastic material.

20. The arrangement according to claim 18, wherein said funnel-shaped closure lid is formed of silicone.

* * * * *